United States Patent
Pistilli et al.

(10) Patent No.: US 11,623,552 B2
(45) Date of Patent: Apr. 11, 2023

(54) VEHICLE SEAT ASSEMBLY WITH IMPACT ENERGY MANAGEMENT

(71) Applicant: LEAR CORPORATION, Southfield, MI (US)

(72) Inventors: Gregory Pistilli, Freising (DE); Florian Gerbl, Berglern (DE); Marvin Kokott, Oberding (DE); Tino Schneider, Isen (DE); Rajdeep Rajput, Freising (DE); Gopal Gangurde, Oberding (DE); Michael Schuhbauer, Schweitenkirchen (DE); Alexej Niederhaus, Velden (DE); Arunkumar Boda, Ingolstadt (DE); Mathias Busch, Freising (DE)

(73) Assignee: Lear Corporation, Southfield, MI (US)

( * ) Notice: Subject to any disclaimer, the term of this patent is extended or adjusted under 35 U.S.C. 154(b) by 32 days.

(21) Appl. No.: 17/472,296

(22) Filed: Sep. 10, 2021

(65) Prior Publication Data
US 2022/0185160 A1 Jun. 16, 2022

(30) Foreign Application Priority Data
Dec. 16, 2020 (DE) .................... 10 2020 133 747.7

(51) Int. Cl.
*B60N 2/888* (2018.01)
*B60N 2/897* (2018.01)
(Continued)

(52) U.S. Cl.
CPC .......... *B60N 2/888* (2018.02); *B60N 2/4228* (2013.01); *B60N 2/42745* (2013.01); *B60N 2/682* (2013.01); *B60N 2/897* (2018.02)

(58) Field of Classification Search
CPC ............................... B60N 2/888; B60N 2/897
See application file for complete search history.

(56) References Cited

U.S. PATENT DOCUMENTS 6,604,788 B1 * 8/2003 Humer ................... B60N 2/809
297/216.12
9,592,755 B2 3/2017 Takayama et al.
(Continued)

FOREIGN PATENT DOCUMENTS

CN 101121388 A * 2/2008 ............... B60N 2/42
CN 207842738 U 9/2018
(Continued)

OTHER PUBLICATIONS

German Office Action for Application No. 10 2020 133 747.7, dated Feb. 4, 2022, 9 pages.

*Primary Examiner* — Timothy J Brindley
(74) *Attorney, Agent, or Firm* — Brooks Kushman P.C.

(57) ABSTRACT

A vehicle seat assembly is provided with a seatback frame adapted to be mounted to a vehicle interior. The seatback frame has a front region facing a forward direction, and a rear region. A first bracket is mounted to the front region of the seatback frame. A second bracket is mounted to the first bracket and the rear region of the seatback frame. At least one head restraint post is mounted to the first bracket or the second bracket and spaced apart from the seatback frame so that upon a rear vehicle impact, the second bracket deforms as the at least one head restraint post is translated toward the seatback frame.

20 Claims, 4 Drawing Sheets

(51) Int. Cl.
    *B60N 2/42*         (2006.01)
    *B60N 2/427*     (2006.01)
    *B60N 2/68*         (2006.01)

(56) References Cited

U.S. PATENT DOCUMENTS

| | | | |
|---|---|---|---|
| 10,093,202 B2 | 10/2018 | Fujita et al. | |
| 2002/0050729 A1* | 5/2002 | Nakano | B60N 2/809 |
| | | | 297/216.12 |
| 2017/0368974 A1* | 12/2017 | Yonehara | B60N 2/682 |
| 2019/0248256 A1 | 8/2019 | Fischer et al. | |
| 2020/0010003 A1* | 1/2020 | Okuma | B60N 2/897 |
| 2021/0061140 A1* | 3/2021 | Nagai | B60N 2/888 |
| 2021/0188142 A1 | 6/2021 | Busch et al. | |
| 2021/0188143 A1 | 6/2021 | Pistilli et al. | |

FOREIGN PATENT DOCUMENTS

| | | | | |
|---|---|---|---|---|
| CN | 112874391 A | * | 6/2021 | ........... B60N 2/0232 |
| DE | 102019220261 A1 | | 6/2021 | |
| FR | 2968613 A1 | | 6/2012 | |
| JP | 2010018140 A | | 1/2010 | |
| JP | 2016007953 A | | 1/2016 | |

* cited by examiner

VEHICLE SEAT ASSEMBLY WITH IMPACT ENERGY MANAGEMENT

CROSS-REFERENCE TO RELATED APPLICATION

This application claims foreign priority benefits under 35 U.S.C. § 119(a)-(d) to DE 10 2020 133 747.7, filed Dec. 16, 2020, the disclosure of which is hereby incorporated by reference in its entirety.

TECHNICAL FIELD

Various embodiments relate to vehicle seat assemblies including a head restraint extending from a seatback to support the back and head of an occupant during travel and during a rear impact condition.

BACKGROUND

Vehicle seat assemblies often include a head restraint extending from a seatback to support the back and head of an occupant during travel and during a rear impact condition.

SUMMARY

According to an embodiment, a vehicle seat assembly is provided with a seatback frame adapted to be mounted to a vehicle interior. The seatback frame has a front region facing a forward direction, and a rear region. A first bracket is mounted to the front region of the seatback frame. A second bracket is mounted to the first bracket and the rear region of the seatback frame. At least one head restraint post is mounted to the first bracket or the second bracket and spaced apart from the seatback frame so that upon a rear vehicle impact, the second bracket deforms as the at least one head restraint post is translated toward the seatback frame.

According to a further embodiment, the seatback frame is provided with an upper crossbar and a substrate.

According to an even further embodiment, the first bracket is provided with an upper end mounted to the upper crossbar, and a lower end mounted to the substrate.

According to another even further embodiment, the second bracket is provided with an upper end mounted to the upper crossbar, and a lower end mounted to the first bracket lower end.

According to another even further embodiment, the second bracket is further provided with a primary substrate extending in an upright direction. A pair of sidewalls extend from the primary substrate to space the primary substrate away from the upper crossbar.

According to an even further embodiment, the second bracket is further provided with a pair of upper flanges each extending from one of the pair of sidewalls and mounted to the upper crossbar.

According to an even further embodiment, the pair of upper flanges are coplanar to provide a surface contact to a rear surface of the upper crossbar.

According to another further embodiment, the second bracket is further provided with a pair of intermediate flanges spaced below the pair of upper flanges. Each of the pair of intermediate flanges extend from one of the pair of sidewalls and are mounted to the upper crossbar.

According to an even further embodiment, the pair of intermediate flanges are each angled relative to the pair of sidewalls to provide an edge contact with a bottom surface of the upper crossbar.

According to another further embodiment, the second bracket is further provided with a secondary substrate extending from the primary substrate and angled relative to the primary substrate to extend below the upper crossbar and towards the first bracket.

According to an even further embodiment, the second bracket is further provided with a lower flange extending from the secondary substrate and mounted to the first bracket.

According to another even further embodiment, the lower flange extends from both lateral sides of the secondary substrate and below the secondary substrate.

According to another even further embodiment, the lower flange is curved in the forward direction.

According to another further embodiment, the lower flange is disposed between the first bracket and the seatback frame substrate.

According to another further embodiment, the lower flange is welded to the first bracket and the seatback frame substrate.

According to another further embodiment, the lower flange is welded to the first bracket and the seatback frame substrate along a weld path that includes a first curve facing laterally inward and a second curve facing downward, spaced apart from and connected to the first curve.

According to another further embodiment, an aperture is formed through the seatback frame substrate, and the pair of sidewalls of the second bracket extend through the aperture.

According to another embodiment, a vehicle seat bracket is provided with a primary substrate extending in an upright direction. A pair of sidewalls extend from the primary substrate to space the primary substrate away from an upper crossbar of a vehicle seatback frame. A pair of upper flanges each extend from one of the pair of sidewalls to mount to the upper crossbar. A pair of intermediate flanges are spaced below the pair of upper flanges. Each of the pair of intermediate flanges extend from one of the pair of sidewalls to the upper crossbar. A secondary substrate extends from the primary substrate and is angled relative to the primary substrate to extend below the upper crossbar and towards a head restraint support bracket. A lower flange extends from both lateral sides of the secondary substrate and below the secondary substrate, to extend between the head restraint support bracket and a seatback substrate, to be mounted to the head restraint support bracket and the seatback substrate, and is curved in a forward direction.

According to another embodiment, a vehicle seat assembly is provided with a seatback frame adapted to be mounted to a vehicle interior. The seatback frame is an upper crossbar and a substrate, with a front region facing a forward direction, and a rear region. A first bracket with an upper end is mounted to the front region of the upper crossbar, and a lower end is mounted to the front region of the seatback frame substrate. A second bracket is provided with a primary substrate extending in an upright direction. A pair of sidewalls extend from the primary substrate to space the primary substrate away from the upper crossbar. A pair of upper flanges each extend from one of the pair of sidewalls and are mounted to the upper crossbar. A pair of intermediate flanges are spaced below the pair of upper flanges. Each of the pair of intermediate flanges extend from one of the pair of sidewalls and are mounted to the upper crossbar. A secondary substrate extends from the primary substrate and is angled relative to the primary substrate below the upper crossbar and towards the first bracket. A lower flange extends from both lateral sides of the secondary substrate and below the secondary substrate, between the first bracket and the seatback substrate, is welded to the first bracket and the seatback substrate, and is curved in the forward direction. At least one head restraint post is mounted to the first bracket or the second bracket and spaced apart from the seatback frame so that upon a rear vehicle impact, the second bracket deforms as the at least one head restraint post is translated toward the seatback frame.

According to a further embodiment, the lower flange is welded to the first bracket and the seatback frame substrate along a weld path that includes a first curve facing laterally inward and a second curve facing downward, spaced apart from and connected to the first curve.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
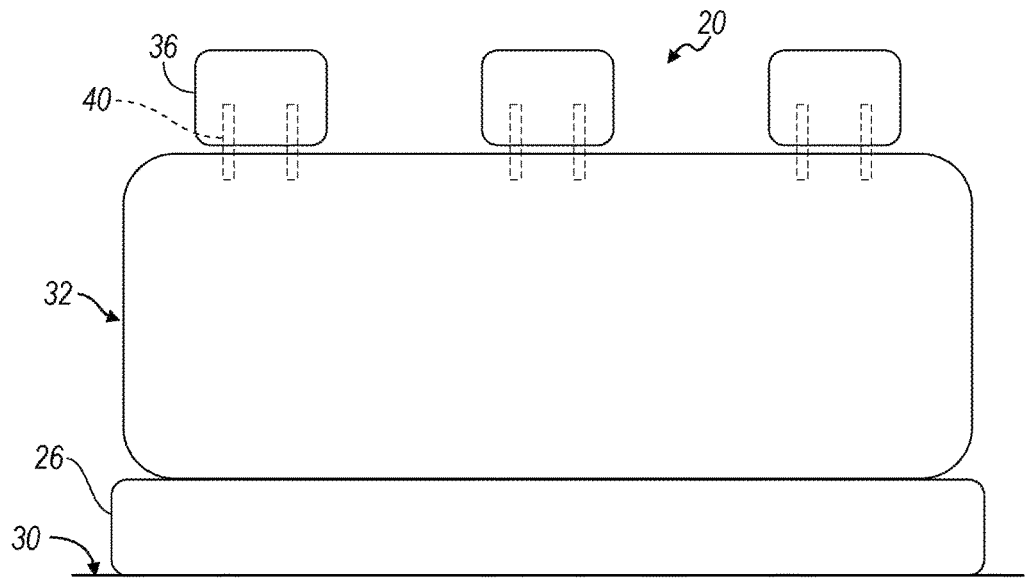
FIG. 1 is a front elevation view of a vehicle seat assembly according to an embodiment.

FIG. 1 illustrates a vehicle seat assembly 20 according to an embodiment. The vehicle seat assembly 20 may be a seat assembly in a land vehicle, such as an automobile. The vehicle seat assembly 20 may also be a seat assembly in an aircraft, watercraft, or the like. The vehicle seat assembly 20 may be a multiple passenger seat assembly with multiple seat subassemblies or a bench seat as illustrated. The seat assembly 20 may be located at any seating position within a vehicle. However, for the depicted seat assembly 20, the seat assembly 20 is a rear seating assembly 20. Additionally, the seat assembly 20 may include any number of seating positions.

The vehicle seat assembly 20 is illustrated in an upright seating position. Of course, the seat may be adjustable to non-seating, loading or cargo positions. However, terms of spatial relation, such as above, below, upper, lower are terms to describe orientations of components relative to other components, in an upright design or seating position of the seat assembly 20. Likewise, terms such as forward and rearward refer to a forward seating position of an occupant in the upright seat assembly 20.

The seat assembly 20 includes a seat bottom 26 mounted to a vehicle interior, such as a vehicle floor 30 of a vehicle body. The seat assembly 20 also includes a seatback 32, which is also mounted to the vehicle body. The seatback 32 may be mounted directly to the vehicle body, or may be pivotally connected to the seat bottom 26 to support the seatback 32 at an upright arrangement relative to the seat bottom 26.

The seat assembly 20 also includes a plurality of head restraints 36, each supported above the seatback 32. The head restraints 36 are each connected to the seatback 32 by a pair of head restraint posts 40. The head restraint posts 40 are connected to corresponding head restraints 36 and the seatback 32 to support and orient the head restraints 36 relative to the seatback 32. As is known in the art, the head restraints 36 may be adjustable relative to the head restraint posts 40. As is also known in the art, the posts 40 may be adjustable relative to the seatback 32.

Figure 2:
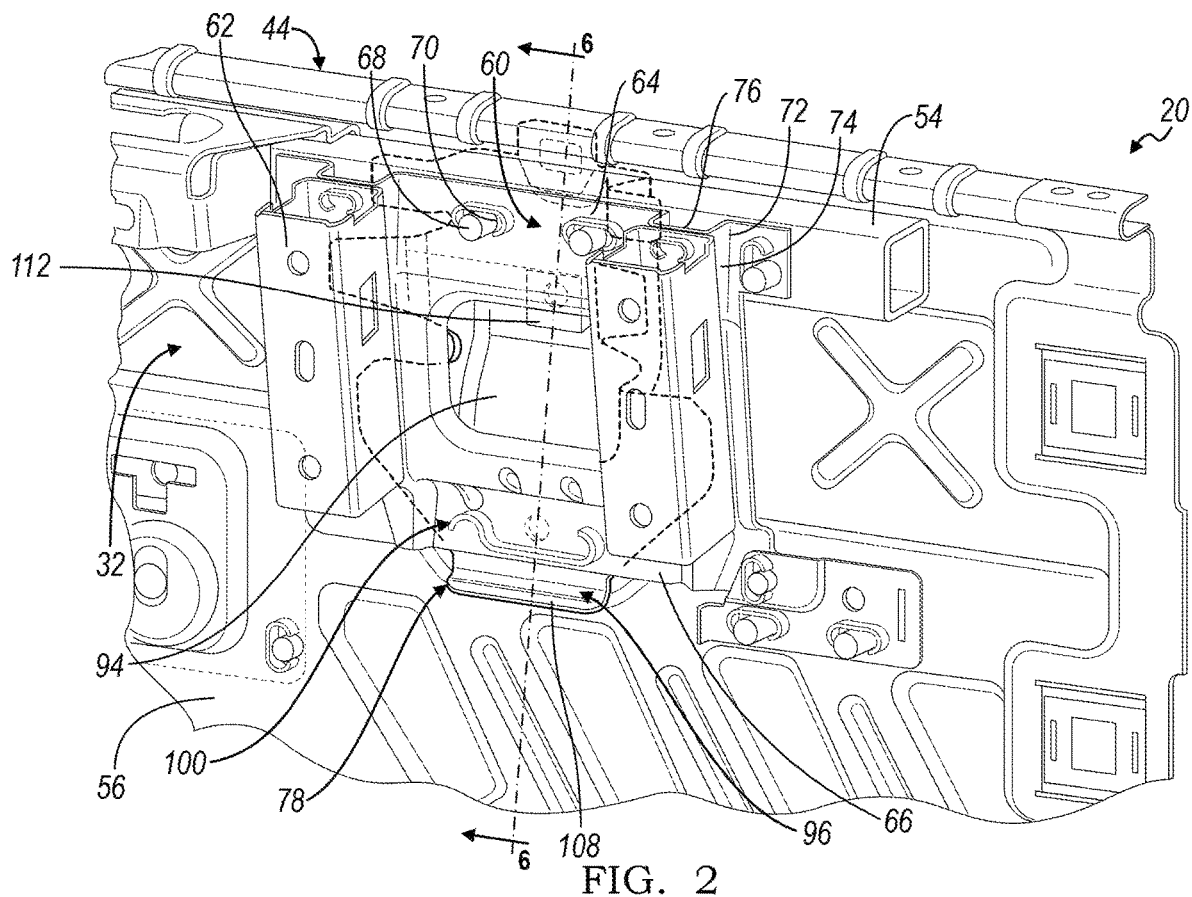
FIG. 2 is an enlarged front perspective view of a portion of a seatback of the vehicle seat assembly of FIG. 1 according to an embodiment, illustrated partially disassembled.
Figure 3:
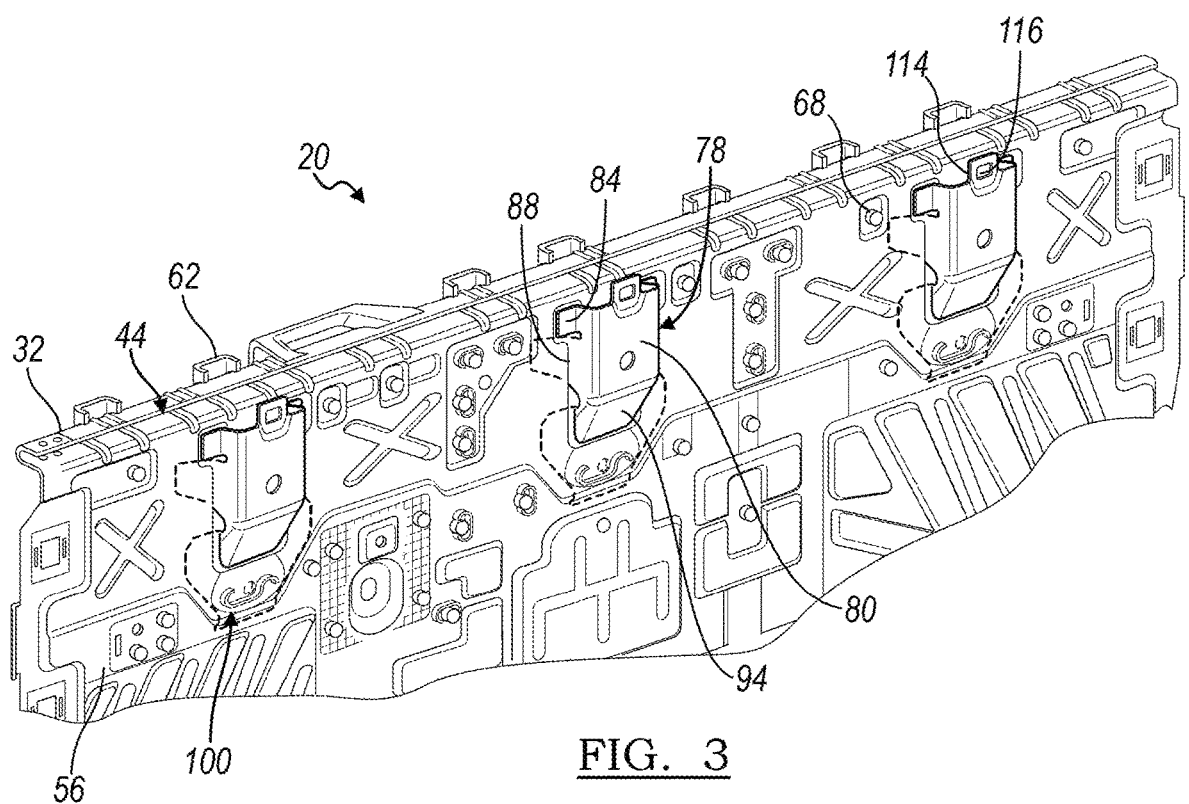
FIG. 3 is an enlarged rear perspective view of a portion of the seatback of the vehicle seat assembly of FIG. 1 according to an embodiment, illustrated partially disassembled.

The seat bottom 26, the seatback 32, and the head restraints 36 each include an underlying frame, cushioning and trim, as is known in the art. FIGS. 2 and 3 illustrate a seatback frame 44 for the seatback 32 with trim and cushioning removed. Each seatback frame 44 includes an upper crossbar 54. Each seatback frame 44 also includes a substrate or platform 56 spanning across the seatback 32 and to separate the vehicle interior from a trunk or a cargo compartment. The components of the seatback frame 44 may be formed from a structurally resilient material, such as a steel alloy, a polymeric material or the like.

It is common in the prior art to install a head restraint directly to the seatback frame by welding. In a rear impact condition, the seat assembly is accelerated into the occupant, and consequently the seatback is accelerated into the back of the occupant, while the head restraint is accelerated into the head of the occupant. In order to manage energy of the impact condition upon the head of an occupant, a less stiff connection of the head restraints 36 to seatback frame 44 is provided by the vehicle seat assembly 20.

The vehicle seat assembly 20 includes a plurality of head restraint support brackets 60. The head restraint support brackets 60 are each mounted to an upper, front region of the seatback frame 44. Each head restraint support bracket 60 supports a pair of head restraint tubes 62. The pair of head restraint tubes 62 receive the head restraint posts 40 to support the head restraints 36 upon the seatback 32. An adjustment mechanism may be provided in the tubes 62 to receive the posts 40 for adjustment of the posts 40, and consequently adjustment of the head restraints 36 relative to the seatback 32.

The head restraint support bracket 60 is formed from stamped sheet steel with a substrate 64. The substrate 64 is displaced along the upper crossbar 54 of the seatback frame 44. The head restraint support bracket 60 also includes an offset region 66 at a lower proximal end of the head restraint support bracket 60. The offset region 66 is offset from the bracket substrate 64 to engage the seat frame platform 56 of the seatback frame 44. The offset region 66 is generally parallel to the bracket substrate 64 and offset by a thickness of the upper crossbar 54. The head restraint support bracket 60 is illustrated and described in greater detail in Germany patent application DE 102019220261.6, filed on Dec. 19, 2019 by Lear Corporation, which is incorporated in its entirety by reference herein.

Each seatback frame 44 may include a plurality of alignment pins 68 extending from the upper crossbar 54 and the seatback frame platform 56. Likewise, the head restraint support bracket 60 includes a plurality of apertures 70 in the bracket substrate 64 and the offset region 66 to receive the alignment pins 68. The alignment pins 68 align the head restraint support brackets 60 relative to the seatback frames 44. The head restraint support brackets 60 are fastened to the seatback frames 44 by a suitable fastener, such as laser welding.

Each head restraint support bracket 60 includes a pair of projections 72 extending forward from the bracket substrate 64. Each projection 72 includes a pair of sidewalls 74 extending from the substrate 64, interconnected with a support plate 76, which is spaced apart from the substrate 64. Each support plate 76 provides a forward mounting surface for mounting one of the head restraint tubes 62. According to an embodiment, the head restraint tubes 62 are also formed form steel and are welded to the support plates 76 of the head restraint support bracket 60.

Figure 4:
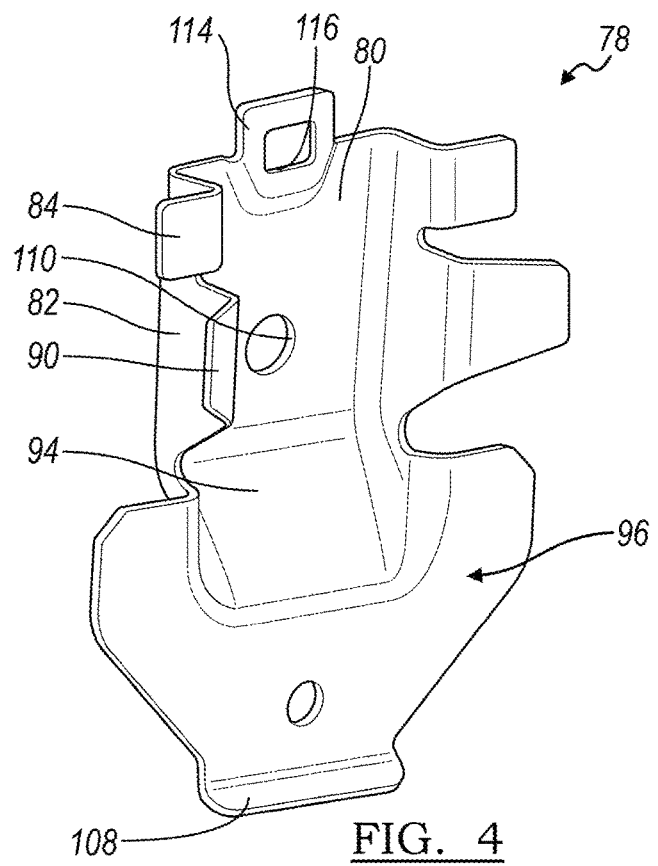
FIG. 4 is an enlarged front perspective view of a bracket of the vehicle seat assembly of FIG. 1.
Figures 5, 6:
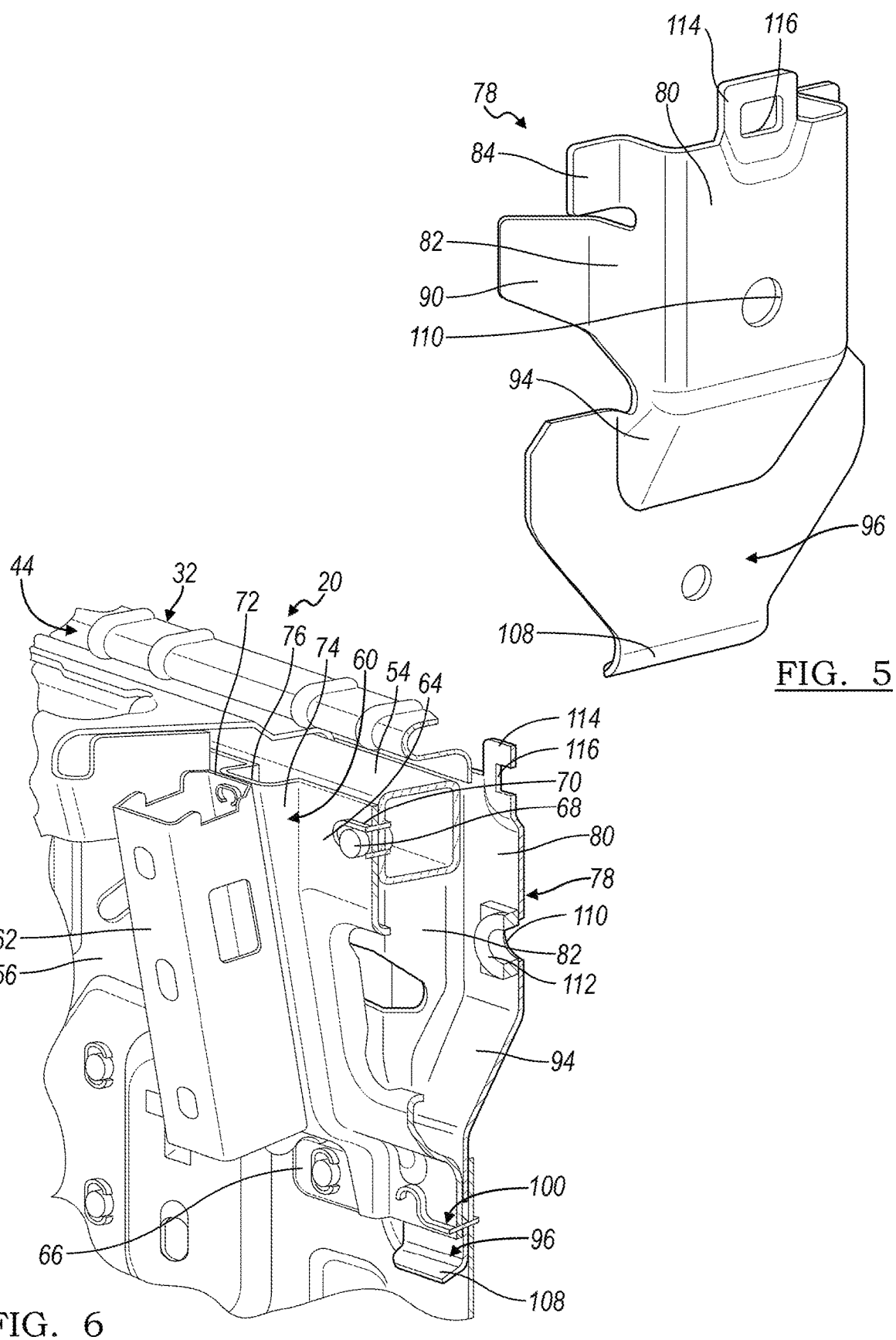
FIG. 5 is an enlarged rear perspective view of the bracket of FIG. 4.
FIG. 6 is a front perspective partial section view taken along section line 6-6 in FIG. 2.

The seat assembly 20 also includes a plurality of deformation brackets 78 mounted to an upper, rear region of the seat assembly 20. The deformation brackets 78 are illustrated disassembled from the seat assembly 20 in FIGS. 4 and 5. The deformation brackets 78 are also illustrated in greater detail in cooperation with the seat assembly 20 in FIGS. 6-8. The deformation brackets 78 are mounted to the upper crossbar 54 of the seatback frame 44 and the head restraint support bracket 60. The deformation brackets 78 are designed to deform to manage energy in a rear impact condition in order to increase deformation, and consequently optimize deceleration of the head restraint 36 toward the seatback frame 44 to dissipate some of the impact forces of a rear impact. The deformation brackets 78 are also lightweight. The deformation brackets 78 permit a weight reduction to the seat assembly 20, while also meeting optimal deformation limits under predefined loading due to the multifunctional features of the brackets 78.

The deformation brackets 78 are formed from stamped sheet steel. With reference to FIGS. 3-8, the deformation brackets 78 include a primary substrate 80 extending in an upright direction. A pair of sidewalls 82 extend from the primary substrate 80 to space the primary substrate 80 away from the upper crossbar 54. A pair of upper flanges 84 each extend from one of the sidewalls 82. The upper flanges 84 are mounted to the upper crossbar 54. The pair of upper flanges 84 are coplanar to provide a surface contact to a rear surface of the upper crossbar 54. The upper flanges 84 are welded to the upper crossbar 54 along weld seams 86. The weld seams 86 are provided along multiple edges of each upper flange 84, such as an upper edge and an outward edge, to maximize a fastened connection between the upper flanges 84 and the upper crossbar 54. An aperture 88 may be formed in the seat back frame substrate 56 to permit the primary substrate 80 and the sidewalls 82 to at least partially extend through the seat back frame substrate 56.

Figure 8:
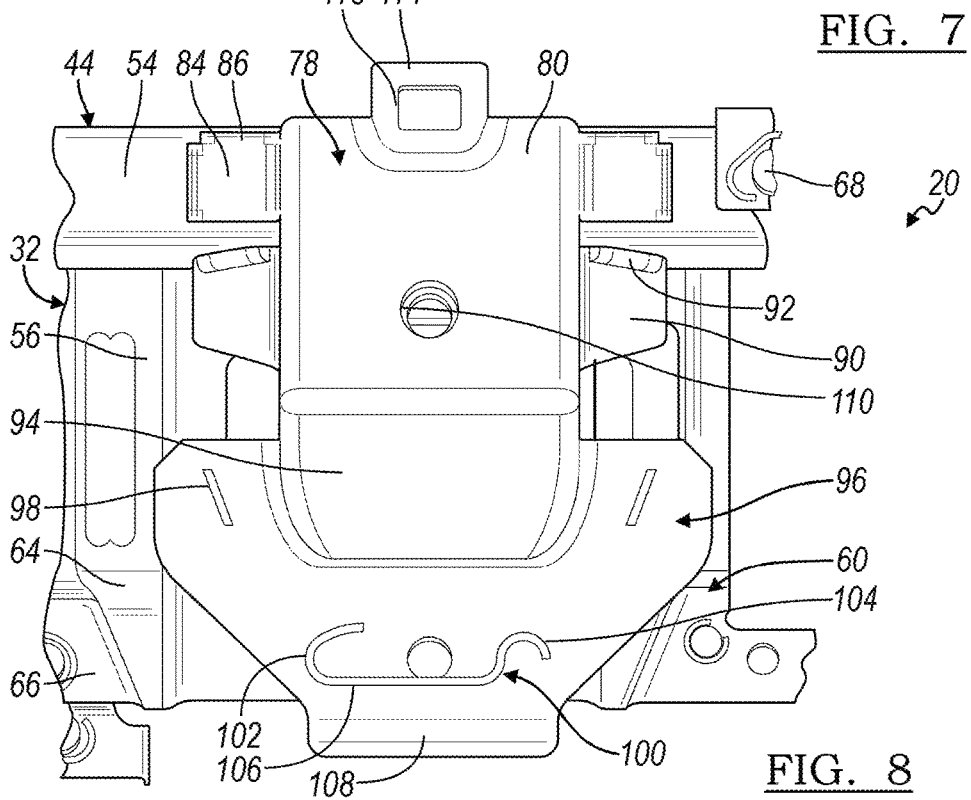
FIG. 8 is another enlarged rear perspective view of a portion of the seatback of the vehicle seat assembly of FIG. 1, illustrated partially disassembled.

A pair of intermediate flanges 90 also extend from the sidewalls 82, below the upper flanges 84. The intermediate flanges 90 are angled to extend further forward than the upper flanges 84 to engage the upper crossbar 54 at a bottom surface with an edge contact. As illustrated in FIG. 8, weld seams 92 are provided along an upper edge of the intermediate flanges 90 and the upper crossbar 54 to further fasten the deformation bracket 78 to the upper crossbar 54.

Figure 7:
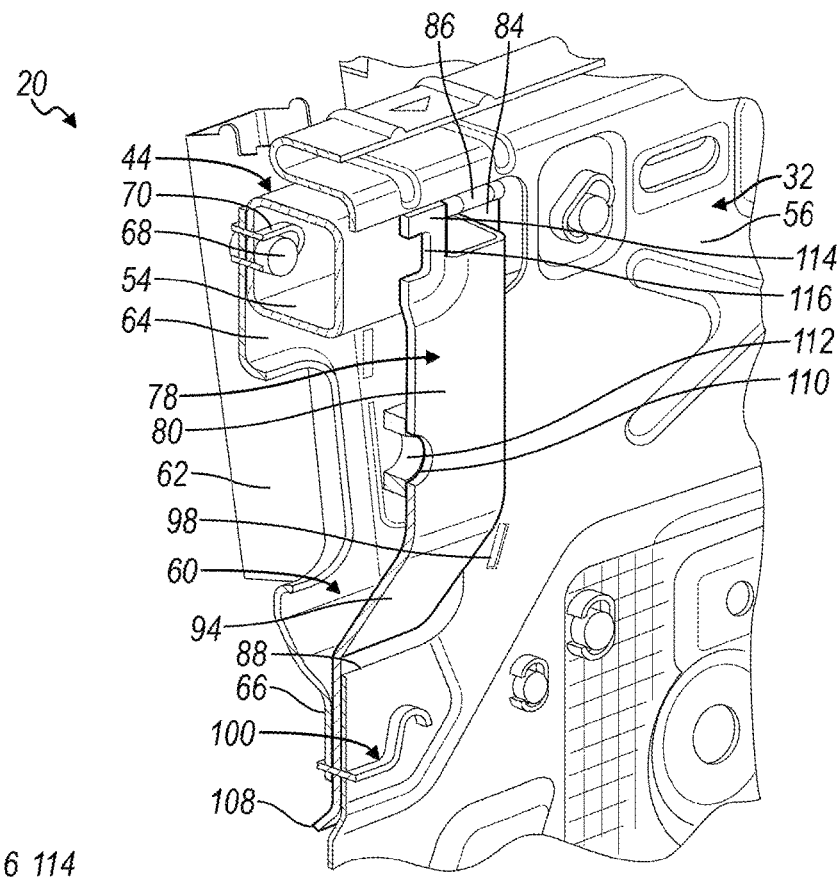
FIG. 7 is a rear perspective partial section view taken along section line 6-6 in FIG. 2.

Referring now to FIGS. 2-8, each deformation bracket 78 includes a secondary substrate 94 extending below the primary substrate 80. The secondary substrate 94 is angled forward to extend below the upper crossbar 54 and towards the head restraint support bracket 60. A lower flange 96 extends from the secondary substrate 94. The lower flange 96 extends laterally from the secondary substrate 94 and below the secondary substrate 94 to provide a surface contact with the offset region 66 of the head restraint support bracket 60. The lower flange 96 also provides a surface contact with the seatback frame substrate 56, in between the seatback frame substrate 56 and the offset region 66 of the head restraint support bracket 60. Referring to FIGS. 7 and 8, a pair of lateral weld seams 98 are provided to attach the seatback frame substrate 56 to the lower flange 96.

With reference now to FIGS. 2, 3, and 6-8, a lower weld seam 100 attaches the seatback frame substrate 56, the head restraint support bracket 60 and the deformation bracket 78. As illustrated in FIG. 8, the lower weld seam 100 follows a weld path with a pair of curves 102, 104 connected by a straight segment 106 therebetween. One of the weld curves 102 faces laterally inward, and the other curve 104 faces downward. The curvature of the lower weld seam 100 permits the welding of various layers of varying thicknesses and manages attachment during acceptable deformation limits of the deformation bracket 78. The curvature of the lower weld seam 100 also permits a relatively wide weld seam 100 while managing applicable loading.

A lower region 108 of the lower flange 96 is curved forward and extends forward and through the aperture 88 in the seatback frame substrate 56. The lower region 108 provides additional energy management to absorb energy during deformation and mitigating failure. Upon a resultant force upon the head of the occupant reaching a predetermined design limit, the resultant force is distributed through the head restraint support bracket 60 and the deformation bracket 78, whereby the deformation bracket 78 deforms elastically and then plastically to absorb and dissipate the impact forces to manage energy from the impact. The predetermined force for collapsing the deformation bracket 78 can be optimized by selection of bracket materials, thickness of the sheet metal, size of the deformation bracket 78 features, and other variables in the design of the deformation bracket 78. During deformation, remaining reaction loads are distributed into the upper crossbar 54. The depicted embodiment is designed to deform between five and ten degrees, such as seven degrees to mitigate whiplash.

An aperture 110 is formed through the primary substrate 80 of the deformation bracket 78. The aperture 110 may be utilized as an anchorage point for the seat assembly 20. For example, a fastener, such as a nut 112 may be attached to the deformation bracket 78 at the aperture 110. The nut 112 may be laser-welded, clinched, or otherwise fastened to the primary substrate 80 to provide a fastening location to fasten another component of the seat assembly 20.

The deformation bracket 78 may also be provided with a tab 114 extending upward from the primary substrate 80. An aperture 116 is formed through the tab 114. The tab 114 and the aperture 116 may be utilized with installation hardware for aligning and the deformation bracket 78 during welding and installation of the deformation bracket 78 to the seatback frame 44 and the head restraint support bracket 60.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat assembly comprising:
    a seatback frame adapted to be mounted to a vehicle interior, the seatback frame having a front region facing a forward direction, and a rear region;
    a first bracket mounted to the front region of the seatback frame;
    a second bracket mounted to the first bracket and the rear region of the seatback frame; and
    at least one head restraint post mounted to the first bracket or the second bracket and spaced apart from the seatback frame so that upon a rear vehicle impact, the second bracket deforms as the at least one head restraint post is translated toward the seatback frame.

2. The vehicle seat assembly of claim 1 wherein the seatback frame comprises an upper crossbar and a substrate.

3. The vehicle seat assembly of claim 2 wherein the first bracket comprises an upper end mounted to the upper crossbar and a lower end mounted to the substrate.

4. The vehicle seat assembly of claim 3 wherein the second bracket comprises an upper end mounted to the upper crossbar and a lower end mounted to the first bracket lower end.

5. The vehicle seat assembly of claim 3 wherein the second bracket further comprises:
    a primary substrate extending in an upright direction; and
    a pair of sidewalls extending from the primary substrate to space the primary substrate away from the upper crossbar.

6. The vehicle seat assembly of claim 5 wherein the second bracket further comprises a pair of upper flanges each extending from one of the pair of sidewalls and mounted to the upper crossbar.

7. The vehicle seat assembly of claim 6 wherein the pair of upper flanges are coplanar to provide a surface contact to a rear surface of the upper crossbar.

8. The vehicle seat assembly of claim 6 wherein the second bracket further comprises a pair of intermediate flanges spaced below the pair of upper flanges, each of the pair of intermediate flanges extending from one of the pair of sidewalls and mounted to the upper crossbar.

9. The vehicle seat assembly of claim 8 wherein the pair of intermediate flanges are each angled relative to the pair of sidewalls to provide an edge contact with a bottom surface of the upper crossbar.

10. The vehicle seat assembly of claim 5 wherein the second bracket further comprises a secondary substrate extending from the primary substrate and angled relative to the primary substrate to extend below the upper crossbar and towards the first bracket.

11. The vehicle seat assembly of claim 10 wherein the second bracket further comprises a lower flange extending from the secondary substrate and mounted to the first bracket.

12. The vehicle seat assembly of claim 11 wherein the lower flange extends from both lateral sides of the secondary substrate and below the secondary substrate.

13. The vehicle seat assembly of claim 12 wherein the lower flange is curved in the forward direction.

14. The vehicle seat assembly of claim 12 wherein the lower flange is disposed between the first bracket and the seatback frame substrate.

15. The vehicle seat assembly of claim 12 wherein the lower flange is welded to the first bracket and the seatback frame substrate.

16. The vehicle seat assembly of claim 12 wherein the lower flange is welded to the first bracket and the seatback frame substrate along a weld path that includes a first curve facing laterally inward and a second curve facing downward, spaced apart from and connected to the first curve.

17. The vehicle seat assembly of claim 5 wherein an aperture is formed through the seatback frame substrate, and the pair of sidewalls of the second bracket extend through the aperture.

18. A vehicle seat bracket comprising:
    a primary substrate extending in an upright direction;
    a pair of sidewalls extending from the primary substrate to space the primary substrate away from an upper crossbar of a vehicle seatback frame;
    a pair of upper flanges each extending from one of the pair of sidewalls to mount to the upper crossbar;
    a pair of intermediate flanges spaced below the pair of upper flanges, each of the pair of intermediate flanges extending from one of the pair of sidewalls to the upper crossbar;
    a secondary substrate extending from the primary substrate and angled relative to the primary substrate to extend below the upper crossbar and towards a head restraint support bracket; and
    a lower flange extending from both lateral sides of the secondary substrate and below the secondary substrate, to extend between the head restraint support bracket and a seatback substrate, to be mounted to the head restraint support bracket and the seatback substrate, and curved in a forward direction.

19. A vehicle seat assembly comprising:
    a seatback frame adapted to be mounted to a vehicle interior, the seatback frame comprising an upper crossbar and a substrate, with a front region facing a forward direction, and a rear region;
    a first bracket with an upper end mounted to the front region of the upper crossbar, and a lower end mounted to the front region of the seatback frame substrate;
    a second bracket comprising:
        a primary substrate extending in an upright direction,
        a pair of sidewalls extending from the primary substrate to space the primary substrate away from the upper crossbar,
        a pair of upper flanges each extending from one of the pair of sidewalls and mounted to the upper crossbar,
        a pair of intermediate flanges spaced below the pair of upper flanges, each of the pair of intermediate flanges extending from one of the pair of sidewalls and mounted to the upper crossbar,
        a secondary substrate extending from the primary substrate and angled relative to the primary substrate below the upper crossbar and towards the first bracket, and
        a lower flange extending from both lateral sides of the secondary substrate and below the secondary substrate, between the first bracket and the seatback frame substrate, welded to the first bracket and the seatback frame substrate, and curved in the forward direction; and
    at least one head restraint post mounted to the first bracket or the second bracket and spaced apart from the seatback frame so that upon a rear vehicle impact, the second bracket deforms as the at least one head restraint post is translated toward the seatback frame.

20. The vehicle seat assembly of claim 19 wherein the lower flange is welded to the first bracket and the seatback frame substrate along a weld path that includes a first curve facing laterally inward and a second curve facing downward, spaced apart from and connected to the first curve.

* * * * *